Aug. 24, 1965  L. C. FINKLE ETAL  3,202,037
RELEASABLE FASTENER
Filed June 7, 1963 2 Sheets-Sheet 1
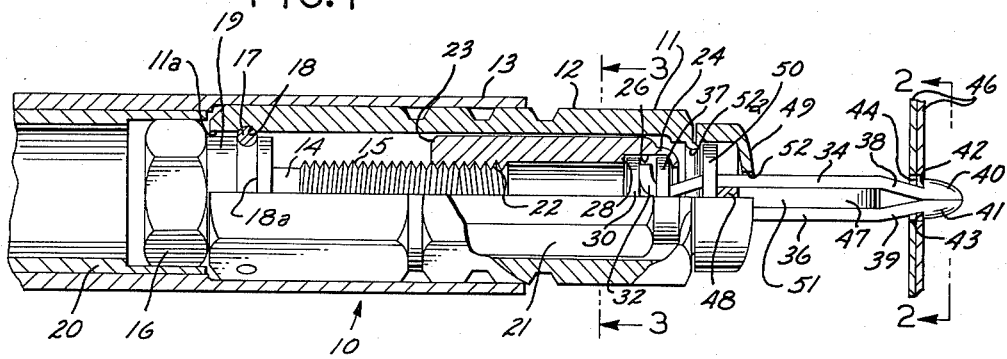
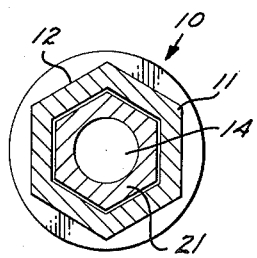
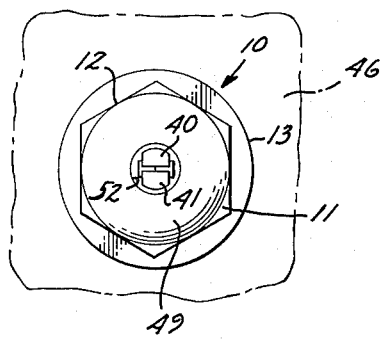
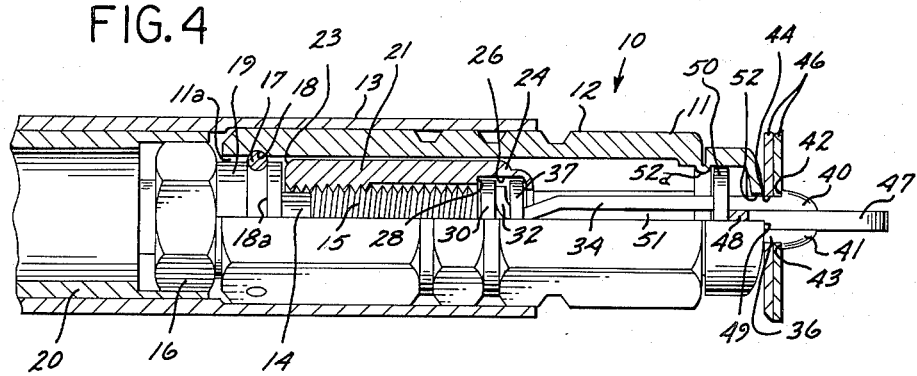
INVENTORS
LEWIS C. FINKLE
KENNETH V. STEWART
BY
R. E. Granque
ATTORNEY Aug. 24, 1965
L. C. FINKLE ETAL
3,202,037
RELEASABLE FASTENER
Filed June 7, 1963
2 Sheets-Sheet 2
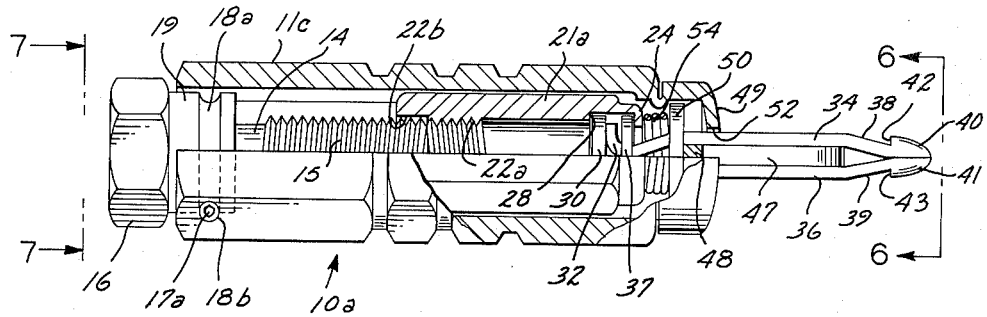
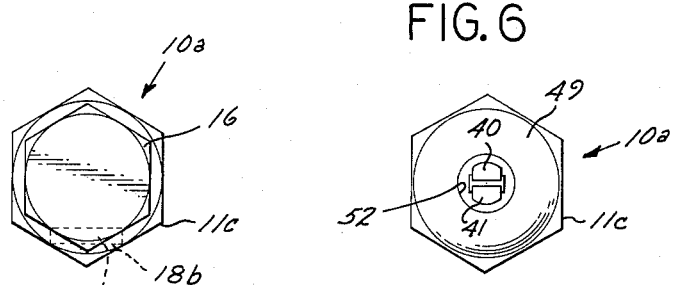
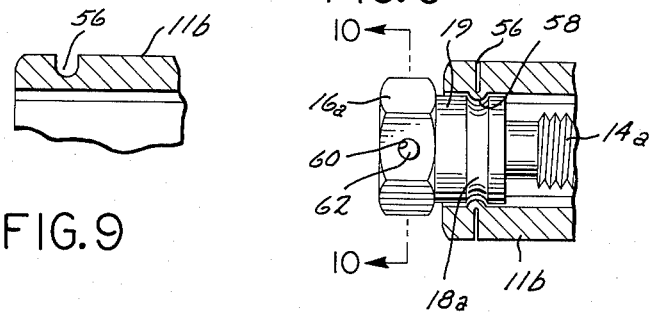
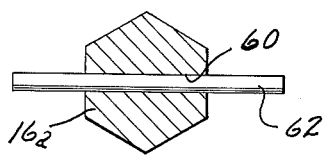
INVENTORS
LEWIS C. FINKLE
KENNETH V. STEWART
BY
R. E. Geauque
ATTORNEY United States Patent Office 3,202,037
Patented Aug. 24, 1965

3,202,037
RELEASABLE FASTENER
Lewis C. Finkle, Temple City, and Kenneth V. Stewart, Northridge, Calif., assignors to Wedgelock Corporation of California, North Hollywood, Calif., a corporation of California
Filed June 7, 1963, Ser. No. 286,355
1 Claim. (Cl. 85—81)

This invention relates to a releasable fastener and more particularly to a pin-type fastener for temporarily securing a plurality of perforated metal sheets together.

In many industrial applications, two or more work pieces are clamped together temporarily while other operations, such as riveting, or the like, are performed to permanently secure the pieces together. For this purpose a releasable fastener is used to clamp the work pieces together by insertion of the fastener in selected perforations of the pieces to hold them together while the riveting operations are completed. Clamps of this type employ expandable pin members which are inserted through the selected perforations of the work pieces and then expanded within the perforations to clamp the pieces while aligning the remaining perforations thereof.

Some prior art releasable fasteners include a stud axially movable in a body portion which is adapted to be held by a powered nut runner attachment while a nut is rotated on the stud to move it longitudinally within the body and protract and retract pin means which are attached to the stud. The nut is adapted to be driven by a driven portion of the nut runner attachment. While generally satisfactory, this tyype of releasable fastener does have the disadvantage that the stud projects from the end of the body when the pins are in their retracted position. This exposes the threads of the stud to damage by contact with other objects and to foreign material which may collect in the threads and impede operation of the fastener.

Therefore, it is one of the objects of the present invention to provide a releasable fastener having a simplified construction which eliminates the projection of a threaded stud beyond the body portion of the fastener.

Another object of the present invention is to provide a new and improved releasable fastener which is operable by a power driven nut runner device for more rapid operation of the fastener.

Yet another object of the present invention is to provide a releasable fastener in which means are provided for retaining a chuck in released relationship with a threaded stud when the stud is rotated to release the fastener.

A further object of the present invention is to provide a new and improved fastener of the character described in which means are provided for preventing jamming of the internal parts thereof when the fastener is being used.

A still further object of the present invention is to provide a new and improved releasable fastener having an internally threaded chuck slidably and non-rotatably mounted in a body portion and engageable by a rotatable, threaded stud which is fixed against longitudinal movement within said body portion.

Yet another object of the present invention is to provide a new and improved releasable fastener which is economical to manufacture and may be used safely and expeditiously.

According to the present invention, a releasable fastener is provided which includes a non-circular body portion having a non-circular bore. A non-circular chuck member is slidably and non-rotatably mounted in the bore of the body member and includes an internal thread at one end which is engageable by an externally threaded screw or stud. The stud is rotatably mounted in the body portion and includes a head having a hexagonal, wrench engaging surface which extends from one end of the body portion. The stud is totally enclosed and is restrained against axial movement so that turning thereof will move the chuck axially within the body portion due to the threaded engagement of the chuck with the stud. The other end of the chuck carries a pair of expandable pins having shoulders engageable with the work pieces which are to be clamped together. The pins extend through an aperture in the work-engaging end of the body portion, which is remote from the head of the stud. Rotation of the stud in one direction retracts the chuck and pins into the body member so that the shoulders on the pins will engage one side of the work pieces and the apertured end of the body portion will engage the other side to clamp the work pieces tightly together. The releasable fastener may be operated by means of a nut runner attachment having a fixed shank portion engageable with the non-circular body portion to prevent it from rotating and having a rotatable portion engageable with the hexagonal head of the stud to rotate the stud and move the chuck longitudinally within the body member. The releasable fastener may also be operated manually with a conventional wrench or with a short bar which is inserted in a transverse bore in the head of the studs. Totally enclosing the stud protects its threads from being damaged by other objects and from foreign material collecting in the threads so that the fastener operates smoother and lasts longer than prior art fasteners having an exposed stud.

The features of the present invention which are believed to be novel are set forth with particularity in the appended claim. The present invention, both as to its organization and manner of operation, together with further objects and advantages thereof, may best be understood by reference to the following description, taken in connection with the accompanying drawings, in which:

FIGURE 1 is a vertical, cross-sectional view as taken substantially along the center line of the releasable fastener of the present invention, with parts thereof shown in elevation;

FIGURE 2 is an end view taken along line 2—2 of FIGURE 1;

FIGURE 3 is a transverse, cross-sectional view taken along line 3—3 of FIGURE 1;

FIGURE 4 is a cross-sectional view, similar to FIGURE 1, illustrating portions thereof in changed position;

FIGURE 5 is a vertical, cross-sectional view as taken substantially along the center line of a modified releasable fastener of the present invention, with parts thereof shown in elevation;

FIGURE 6 is an end view taken along line 6—6 of FIGURE 5;

FIGURE 7 is an end view taken along line 7—7 of FIGURE 5;

FIGURE 8 is a partial, cross-sectional view, with parts shown in elevation, of a modified stud-restraining means;

FIGURE 9 is a partial, cross-sectional view of the restraining means of FIGURE 8 showing one step in the manufacture thereof; and FIGURE 10 is a vertical cross-sectional view taken along line 10—10 of FIGURE 8.

Referring again to the drawings and particularly to FIGURES 1-4, the releasable fastener constituting a first embodiment of the present invention, generally designated 10, includes a body 11 having a non-circular, outer configuration, as for example, the hexagonal outer surface 12 which adapts the body 11 to be non-rotatably held by the fixed sleeve 13 of a nut runner attachment, not shown. A screw or stud member 14 having an external thread 15 and a hexagonal head 16 is rotatably mounted in the body 11 with the head 16 extending from one end 11a thereof. The stud member 14 is prevented from axial movement relative to the body 11 by means of a lock wire 17 which engages a first annular groove 18 on the inner wall of body 11 and a second annular groove 18a formed on the shoulder 19 of stud 14. The head 16 is adapted to be engaged by an inner, rotatably driven sleeve 20 forming part of a nut runner, not shown, for rotating the stud 14 to move a chuck 21 axially within the body 11 by threadedly engaging the internal threads 22 in one end 23 thereof.

The chuck 21 has an external, hexagonal configuration which slidably engages an internal hexagonal configuration of the body 11. The end 24 of the chuck 21 which is remote from its end 23 includes a cylindrical chamber 26 terminating in an annular shoulder 28 against which a first washer 30 seats. The formed ends 32 of a pair of pins or center wires 34 and 36 are held captive in the chamber 26 between the first washer 30 and a second washer 37 against which the end 24 of the chuck 21 is crimped.

The pins 34 and 36 are mounted in spaced, parallel relationship and each has an outer end converging as at 38 and 39, respectively, and are enlarged at their outer extremities or tips 40 and 41, respectively, to provide inwardly facing shoulders 42 and 43, respectively. In the normal position of FIGURE 1, the tips 40 and 41 are biased into juxtaposition so as to form a spherical exterior insertable through aligned apertures 44 of two or mork pieces or metal sheets 46.

A spreader bar 47 is a of T-shaped configuration and is interposed between the pins 34 and 36 with its cross arm 48 disposed within the body 11 between its work engaging closed end 49 and a retaining washer 50. The central arm 51 of spreader bar 47 extends through an aperture 52 in the closed end 49 of body 11 and between the pins 34 and 36. The spreader bar 47 is held in this position by an annular flange 52a which is formed on the inner wall of body 11 and abuts the washer 50 to prevent axial movement thereof.

In response to rotation of the head 16 in one direction, the stud member 14 threadedly engages the chuck 21 to axially move it to the left, as viewed in FIGURES 1 and 4, to retract the pins 34 and 36 through the aperture 52 of the work engaging closed end 49. The central arm 51 of the spreader bar 47 acts upon the convergent portions 38 and 39 of the pins 34 and 36 to spread the tips 40 and 41 apart and increase their combined outer configuration to one larger than the apertures 44 so that the shoulders 42 and 43 abut the outer surface of the outer work pieces 46 and, when fully retracted, clamp the sheets 46 between the work-piece engaging end 49 and the shoulders 42 and 43, as illustrated in FIGURE 4.

Referring now to FIGURES 5–7, a second embodiment of the releasable fastener of the present invention is generally indicated as 10a and may be identical with the releasable fastener 10 shown in FIGURES 1–4, except that a roll pin 17a may be employed to maintain the stud 14 against axial movement. In this case, the body portion 11c is provided with a transverse bore 18b in place of the internal annular groove 18 to receive the roll pin 17a. The chuck 21a of the releasable fastener 10a has its internal thread 22a relieved, as indicated at 22b, so that the stud 14 will become disengaged from the chuck 21a when the stud 14 is rotated in one direction. A light compression spring 54 may be employed between the washer 50 and the end 24 of the chuck 21a to bias the chuck toward the stud 14 so that the threads 15 of the stud will engage the internal threads 22a of the chuck 21a when the stud is rotated in the other direction. It has been found that in the use of a power driven nut runner attachment, particularly when the head 16 is reversed so as to release the clamping action of the fastener a considerable speed of rotation is built up by the inertia of the head 16 which may cause damage to the internal parts of the fastener 10a by putting too much pressure on them. This is prevented by relieving the thread 22a on the chuck 21a so that the stud 14 may rotate freely when the chuck 21a reaches the end of its travel.

Referring now to FIGURES 8 and 9, the lock wire 17 shown in FIGURE 1 and the roll pin 17a shown in FIGURE 5 may be replaced with an alternate method of locking a stud 14a in position by machining a groove 56 about the outer periphery of the body 11b and then compressing the ends of the body 11b toward each other to collapse the body in the vicinity of the groove 56 to form an internal shoulder 58 on the body 11b to fit the groove 18a on the stud 14a. The head 16a may be provided with a bore 60 which is engageable by a rod 62 to adapt the stud 14a for manual operation. The rod 62 may also be employed to break the stud 14a loose when it is bound so tight that a nut runner cannot loosen it.

While the particular releasable fasteners herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claim.

What is claimed is:

A releasable fastener comprising:
a body having a work engaging closed end and an axial opening extending through said closed end;
stud means rotatably mounted in said body for nonaxial movement relative to said body, said stud means having a wrench engaging head at one end externally of said body and an external threaded portion at its other end within said body;
means restraining said stud means against longitudinal movement comprising a first annular groove formed on the inner wall of said body portion, a second annular groove formed on said stud means, and a snap ring encompassing said second annular groove and engaging said first annular groove;
chuck means movably mounted by said body for non-rotating axial movement relative to said body, said chuck means having an internal thread engageable by the external thread on said stud means for moving said chuck axially within said body, said internal threads of said chuck means being relieved so that said stud means becomes disengaged from said chuck means at the end of its travel in one direction in said body, the relief on said chuck means comprising a non-threaded internal area at said end of larger diameter than the threads on said stud means, said chuck means and body being adjacent one another and non-circular in cross section to prevent relative rotation therebetween;
a pair of work engaging pins secured to said chuck means for linear movement therewith, said pins extending outwardly of said body through said axial opening thereof and having enlarged outer ends adapted to be extended through aligned holes of a work piece; and
spreader means secured to said body for separating said pins in response to retraction of said pins through said opening of said body, rotation of said stud means retracting said pin means by moving said chuck linearly within said body.

References Cited by the Examiner

UNITED STATES PATENTS 2,256,634  9/41  Webb.
2,387,371  10/45  Wallace _____ 85—81
3,144,805  8/64  Lee _____ 85—81

FOREIGN PATENTS 413,403  7/34  Great Britain.
838,518  6/60  Great Britain.

EDWARD C. ALLEN, *Primary Examiner.*